United States Patent [19]

Phelps

[11] 4,220,377

[45] Sep. 2, 1980

[54] EARTH BORING BIT WITH ECCENTRICALLY MACHINED BEARING PIN

[75] Inventor: Francis E. Phelps, Dallas, Tex.

[73] Assignee: Dresser Industries, Inc., Dallas, Tex.

[21] Appl. No.: 71,904

[22] Filed: Sep. 4, 1979

Related U.S. Application Data

[63] Continuation of Ser. No. 927,696, Jul. 24, 1978, abandoned.

[51] Int. Cl.³ .................................. F16C 17/02
[52] U.S. Cl. ........................................ 308/8.2
[58] Field of Search ............... 308/8.2, 239, 237 R, 308/78; 175/371; 76/108 A

[56] References Cited

U.S. PATENT DOCUMENTS

| | | | |
|---|---|---|---|
| 3,384,426 | 5/1968 | Schumacher | 308/8.2 |
| 3,746,405 | 7/1973 | Welton | 308/8.2 |
| 3,890,018 | 6/1975 | Clamon | 308/8.2 |
| 4,061,376 | 12/1977 | Villaloboz | 308/8.2 |

Primary Examiner—Lenard A. Footland
Attorney, Agent, or Firm—Fred A. Winans; Eddie E. Scott

[57] ABSTRACT

A rolling cone cutter earth boring bit is provided with an improved bearing system including reduced clearance bearing surfaces and a space for lubricant. At least one cantilevered bearing pin extends from the arm of the bit. A rolling cone cutter is rotatably mounted on the bearing pin. The outer bearing surface of the bearing pin is provided by forming a recess in the load surface of the bearing pin and filling the recess with bearing material. The unloaded surface of the bearing pin is formed by eccentric machining. Reduced clearance is provided between the rolling cone cutter and the load surface of the bearing pin and increased clearance is provided between the rolling cone cutter and the unloaded surface. The clearance on the unloaded surface serves as a lubricant reservoir in close proximity to the load surface of the bearing pin.

2 Claims, 2 Drawing Figures

EARTH BORING BIT WITH ECCENTRICALLY MACHINED BEARING PIN

This is a continuation of application Ser. No. 927,696, filed July 24, 1978 now abandoned.

TECHNICAL FIELD

The present invention relates in general to the art of earth boring and more particularly to a rotary rock bit with an improved bearing system. The present invention is especially adapted for use on that type of rotary rock bit popularly known as a three cone bit; however, its use is not restricted thereto and the bearing system of the present invention can be used in other earth boring bits wherein an improved bearing system is required.

BACKGROUND OF THE INVENTION

A three cone rotary rock bit is adapted to be connected as the lower member of a rotary drill string. As the drill string is rotated the bit disintegrates the formations to form an earth borehole. The three cone rotary rock bit includes three individual arms that extend angularly downward from the main body of the bit. The lower end of each arm is shaped to form a bearing pin or journal. A cone cutter is mounted upon each bearing pin and adapted to rotate thereon. The cone cutters include cutting structure on their outer surfaces that serves to disintegrate the formations as the bit is rotated.

A rotary rock bit must operate under very severe environmental conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cone cutters thereby providing a longer useful lifetime for the cone cutters. This has resulted in the bearing systems being generally the first to fail during the drilling operation. Consequently, a need exists for improved bearing systems to extend the useful lifetime of the bit.

DESCRIPTION OF THE PRIOR ART

In U.S. Pat. No. 3,746,405 to Russell L. Welton, a well drilling bit lubrication system and seal is shown. A journal bearing lubrication means and a seal cooperatively combined therewith to maintain lubrication throughout the useful life of the roller cutter of a well drilling bit, to the exclusion of foreign materials entering therein from the drilling fluids and surrounding earth formations. A journal bearing of right cylinder form is provided, characterized by the formation of a strategically placed recess or recesses therein and all without subtracting from the load carrying capabilities of the bit, the assembly being retained in working condition by a single element combined with the lubrication means and assuring proper axial placement of the roller cutter.

In U.S. Pat. No. 3,890,018 to Robert D. Clamon, a rotary rock bit with a wiper pad lubrication system is shown. A system is provided for circulating lubricant into the loaded contact area between the bearing pin and the rotating cutter of an earth boring bit. The cutter is mounted to rotate about the bearing pin. The cutter includes a cutter interior surface. At least one wiper pad cavity is located in the aforementioned interior surface of the cutter. A wiper pad is positioned in the wiper pad cavity and a resilient member is positioned beneath the wiper pad. As the cutter rotates, the wiper pad forces lubricant into the load area between the bearing pin and the interior surface of the cutter.

In U.S. Pat. No. 4,061,376 to Arthur A. Villaloboz, a rock bit bearing structure is shown. A rock bit has a rotary cutter cone journaled on a fixed journal bearing shaft with the radial load being taken by a cylindrical journal bearing. The friction bearing portion of the fixed shaft has a groove extending around the periphery of the shaft. The groove is filled with a bearing metal over an arc on the lower load bearing fraction of the shaft. The remaining unfilled portion of the groove is connected through a lubricant supply passage in the bit body with a pressure-compensated grease reservoir in the bit body to supply lubrication to the journal bearing.

SUMMARY OF THE INVENTION

The present invention provides a rolling cutter earth boring bit with an improved bearing system including a space for lubricant. At least one cantilevered bearing pin extends from the arm of the bit. A rolling cutter is rotatably mounted on the bearing pin. Reduced clearance is provided between the cutter and the bearing pin, enabling the load to be distributed over a greater area. Hard metal is applied to the load bearing surface on the bearing pin before machining. The unloaded portion of the bearing pin is provided with greater clearance to enhance distribution of the lubricant. The unloaded portion of the bearing pin includes an eccentrically machined section. The above and other objects and advantages of the present invention will become more apparent from a consideration of the following detailed description of the invention when taken in conjunction with the drawings.

DETAILED DESCRIPTION OF THE INVENTION

Figure 1:
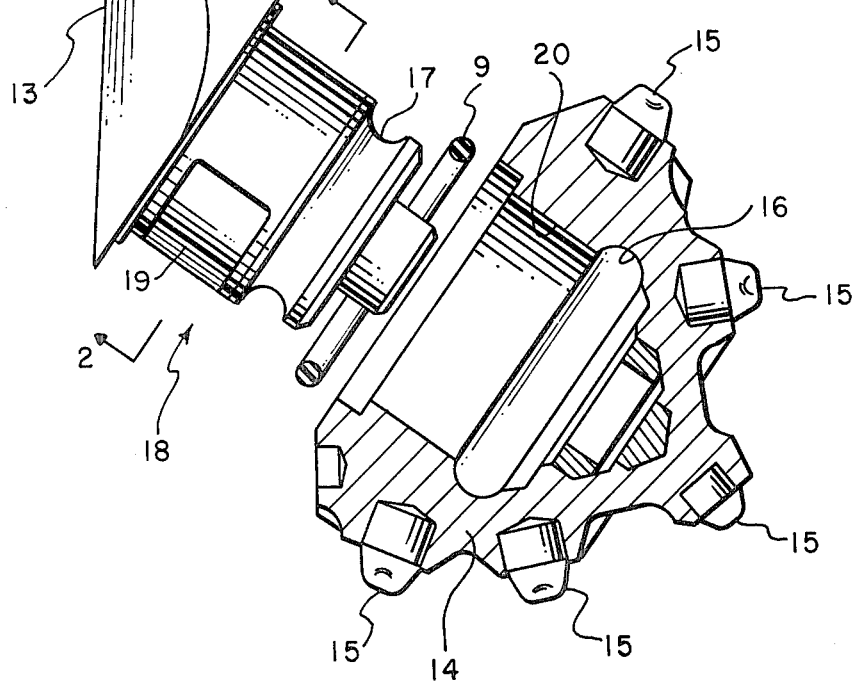
FIG. 1 illustrates one arm of a rotary rock bit constructed in accordance with the present invention.

Referring now to the drawings and to FIG. 1 in particular, illustrated therein and generally designated by the reference number 10 is a three cone sealed bearing rotary rock bit. The bit 10 includes a bit body 11, including an upper threaded portion 12. The threaded portion 12 allows the bit 10 to be connected to the lower end of a rotary drill string (not shown). Depending from the bit body 11 are three substantially identical arms with only the arm 13 being shown in FIG. 1. The lower end of each of the arms is provided with an extended bearing pin comprising a journal portion and the details of this journal portion will be discussed subsequently. Three rotary cone cutters are rotatably positioned on the respective three bearing pins extending from the arms. The cutter 14 is shown in FIG. 1. Each of the cutters includes cutting structure on its outer surface adapted to disintegrate formations as the bit 10 is rotated and moved downward. The cutting structure is shown in the form of tungsten carbide inserts 15. However, it is to be understood that other cutting structures such as steel teeth may be used as a cutting structure on the cone cutters.

The bit 10 includes a central passageway extending along the central axis of body 11 to allow drilling fluid to enter from the upper section of the drill string (not shown) immediately above and pass downward through jet nozzles past the cone cutters. In use, the bit 10 is connected as the lower member of a rotary drill string (not shown) and lowered into the well bore until the cone cutters engage the bottom of the well bore. Upon engagement with the bottom of the well bore, the drill string is rotated, rotating bit 10 therewith. Drilling fluid is forced down through the interior passage of the rotary drill string by mud pumps located at the surface. The drilling fluid continues through the central passageway of bit 10, passing through the nozzles past the cutting structure of the cutters to the bottom of the well bore, thence upward in the annulus between the rotary drill string and the wall of the well bore, carrying with it the cuttings and debris from the drilling operation.

The bearing system of the bit must insure free rotation of the cone cutters under the severe drilling environmental conditions. The improved bearing system of the present invention provides an earth boring bit with a long lifetime and that will withstand the conditions encountered in drilling a deep well. The elongated lower portion of arm 13 forms the bearing pin 18 comprising a journal portion and the rotatable cutter 14 is mounted upon the journal portion. Reduced clearance is provided between the cutter and the bearing pin, enabling the load to be distributed over a greater area. This spreads the load from a line contact to a wider surface to reduce unit load, resulting in reduced wear upon the journal. The spreading of the load will reduce the heat generated by the bearing and reduce disintegration of grease which may be the cause of extreme pressure in bearing and resulting deleterious effects. The reduced clearance between the journal and the cutter will have a cushioning, or shock absorbing, effect between the surfaces in contact during the rough vertical vibration of drilling. The prior art bearings cause the journal and cutter to run eccentrically, resulting in excessive squeezing of the rubber O-ring in the loaded area and reduced, possibly insufficient squeeze in the unloaded area of the journal. The present invention causes the journal centerline and cutter centerline to coincide and produce more evenly distributed squeeze on the O-ring seal. The unloaded portion of the bearing pin includes an eccentrically machined section. The unloaded portion of the bearing pin is thereby provided with greater clearance to enhance distribution of the lubricant.

A series of ball bearings (not shown) that bridge between raceways 16 and 17 insure that rotatable cutter 14 is rotatably locked on bearing pin 18. The rotatable cutter 14 is positioned upon bearing pin 18 and the series of ball bearings inserted through a bore extending into arm 13. After the ball bearings are in place, a plug is inserted in the bore and welded therein. A flexible seal 9 forms a seal between cutter 14 and bearing pin 18 to prevent loss of lubricant or contamination of the lubricant from materials in the well bore. The outer portion of the bearing pin 18 includes a recess on the load side of the bearing pin 18. This recess is filled with a hard metal bearing material. The outer portion of bearing pin 18 cooperates with the outer bearing surface portion 20 on the inside of cutter 14.

One of the prior art rock bit sealing problems involves the clearance between the journal and cutter. When the bit is loaded on the bottom of the borehole with the underside of the journal in contact with the cutter, all the clearance is on the unloaded side of the bearing; thus, increasing O-ring squeeze in the loaded area and reducing O-ring squeeze in the unloaded area. The present invention causes the cone cutter to run concentrically and equalizes squeeze on the O-ring. The lower, load bearing surface of the journal is caused to run concentrically with the seal gland surface (cylindrical) of the cone cutter, thus, causing equalized squeeze on the O-ring seal at both the upper, unloaded and the loaded areas of the bearing.

Figure 2:
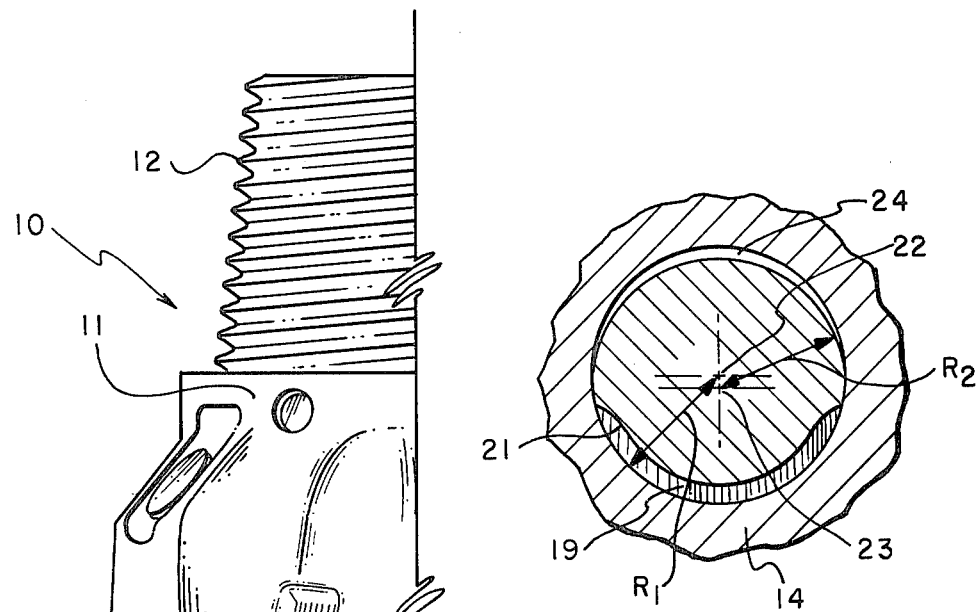
FIG. 2 is a sectional view of the bearing pin and a superimposed view of the rolling cone cutter of the bit shown in FIG. 1.

Referring now to FIG. 2, a sectional view of bearing pin 18 is shown. The recess 21 is cut in the journal portion of bearing pin 18. Bearing material 19 is applied in the recess 21 and machined to coincide with the journal surface on the load side of the journal. A space 24 for lubricant is provided on the upper unloaded side of the bearing pin 18. The central axis 22 of the load side of the bearing pin 18 and the central axis 23 of the unloaded side of the bearing pin 18 are offset. The load side of the journal conforms closely with the contour of the cone bearing and provides greater load bearing contact areas for longer bearing life. Reduced clearance provided between the cutter 14 and journal 18 around the lower half of the journal 18 supports the journal over an area approaching the projected diametral area of the journal 18. The necessary clearance between the two members is obtained by offset grinding or machining the upper half of journal 18. This spreads the load from line contact to a wider surface to reduce unit loading resulting in reduced wear upon the journal. The spreading of the load will reduce the heat generated by the bearing and reduce disintegration of grease which may be the cause of extreme pressure in prior art bearings. The reduced clearance between the journal and the cutter will have a cushioning, or shock absorbing, effect between the surfaces in contact during the rough vertical vibration of drilling.

The structural details of an earth boring bit 10 of the present invention having been described, the construction of the bit 10 will now be considered with reference to FIGS. 1 and 2. The recess 21 is cut in the journal portion of bearing pin 18. Bearing material 19 is applied in the recess 21. The bearing material 19 is ground or machined to coincide with the journal surface on the load side of the journal. The grinding or machining of the load side and unloaded side of the journal is accomplished about axes 22 and 23 respectively. This provides a radius $R_1$ for the load side of the journal and a radius $R_2$ for the unloaded side of the journal. The radii $R_1$ and $R_2$ may be equal, however, it is to be noted that the axes 22 and 23 of radii $R_1$ and $R_2$ respectively are offset. The offset is substantially 0.005 inch providing a 0.001 to 0.007 clearance in the space 24. The central axis of the bearing pin 18 is located at the axis 22. The foregoing provides reduced clearance between the cone cutter and the loaded area of the journal, enabling the load to be distributed over a greater area. The clearance on the load side is substantially 0.001 inch. The unloaded portion of the journal is provided with greater clearance to enhance distribution of the lubricant and to provide necessary clearance to prevent seizure between journal and cutter.

The present invention improves the sealing effect of O-ring seal 9. The prior art bearings cause the journal and cutter to run eccentrically, resulting in excessive squeezing of the rubber O-ring in the loaded area and reduced, possibly, insufficient squeeze in the unloaded area of the journal. The present invention allows the journal 18 centerline and cutter 14 centerline to coincide and produce more evenly distributed squeeze on the O-ring seal. The lifetime and performance of the O-ring seal will be extended because of the improved even loading.

The embodiments of an invention in which an exclusive property or privilege is claimed are defined as follows:

1. A rolling cutter earth boring bit, comprising:
   a bit body;
   at least one bearing pin extending from said bit body, said bearing pin having a bearing pin central axis, a top and a bottom;
   a rolling cone cutter rotatably mounted on said bearing pin, said rolling cutter having a cutter central axis;
   a recess in the bottom of the bearing pin;
   a bearing material filling said recess;
   a load surface on said bearing material, said load surface having a radius that extends about an axis substantially concentric with said bearing pin central axis;
   reduced clearance between said load surface and said rolling cutter providing a greater area of contact between said load surface and said rolling cutter;
   an unloaded surface on said bearing pin, said unloaded surface having a radius that extends about an axis eccentric to said bearing pin central axis;
   lubricant between said rolling cutter and said bearing pin;
   greater clearance between said unloaded surface and said rolling cutter to enhance distribution of said lubricant and prevent seizure; and
   an O-ring positioned between said bearing pin and said rolling cone cutter that is substantially evenly squeezed during operation of said bit.

2. A method of constructing a rotary rock bit, comprising:
   providing a cantilevered bearing pin on said bit, said cantilevered bearing pin having a central axis, a top and a bottom;
   providing a recess in the bottom of the bearing pin;
   filling the recess with bearing material;
   grinding or machining said bearing material about an axis that is substantially concentric to the central axis of the bearing pin thereby providing a load surface;
   forming an unloaded surface on the bearing pin by grinding or machining the top of the bearing pin about an axis that is eccentric to the central axis of the bearing pin to form the unloaded surface; and
   mounting a rolling cutter upon said bearing pin with a greater amount of clearance between said unloaded surface and said rolling cutter and reduced clearance between said load surface and said rolling cutter.

* * * * *